CHRISTOPHER L. SAINTY
Inventor,

May 31, 1960  C. L. SAINTY  2,938,230
MANUFACTURE OF PELLETS OR GRANULAR MATERIAL
Filed Sept. 24, 1956  4 Sheets-Sheet 2
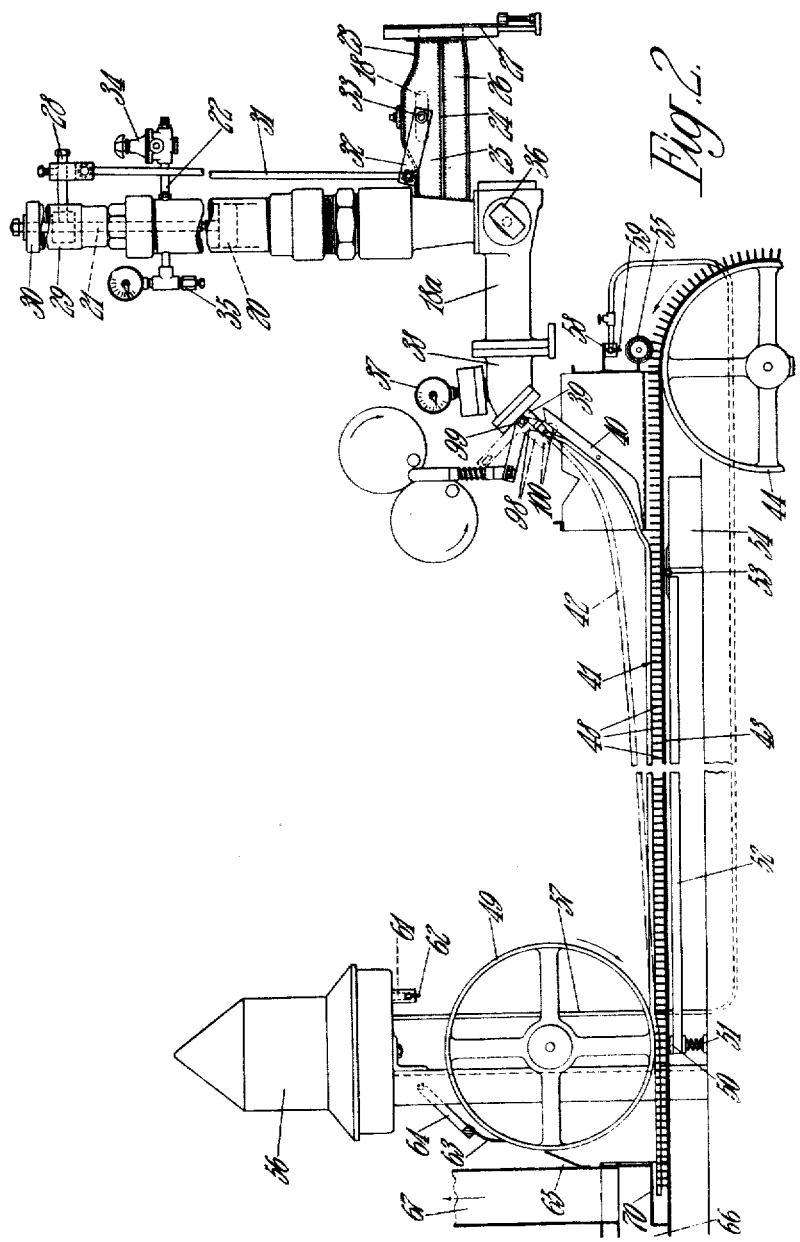
Christopher L. Sainty
Inventor,
by Hall Houghton
Attorney May 31, 1960 C. L. SAINTY 2,938,230
MANUFACTURE OF PELLETS OR GRANULAR MATERIAL
Filed Sept. 24, 1956 4 Sheets-Sheet 3
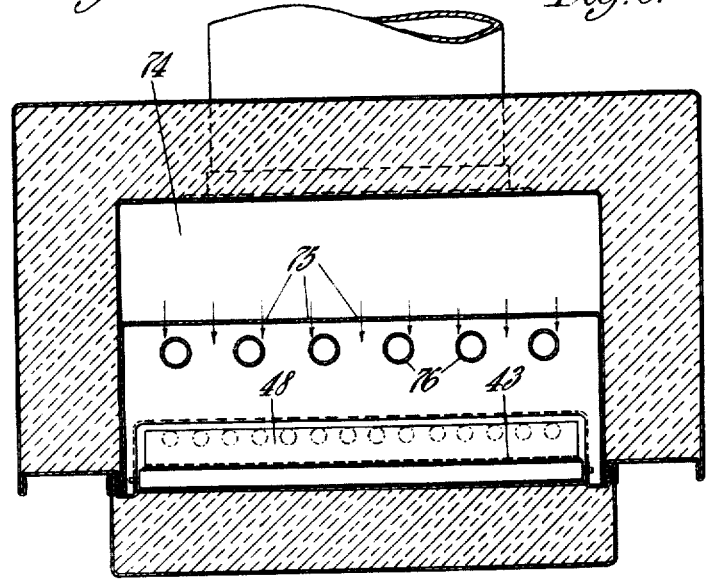

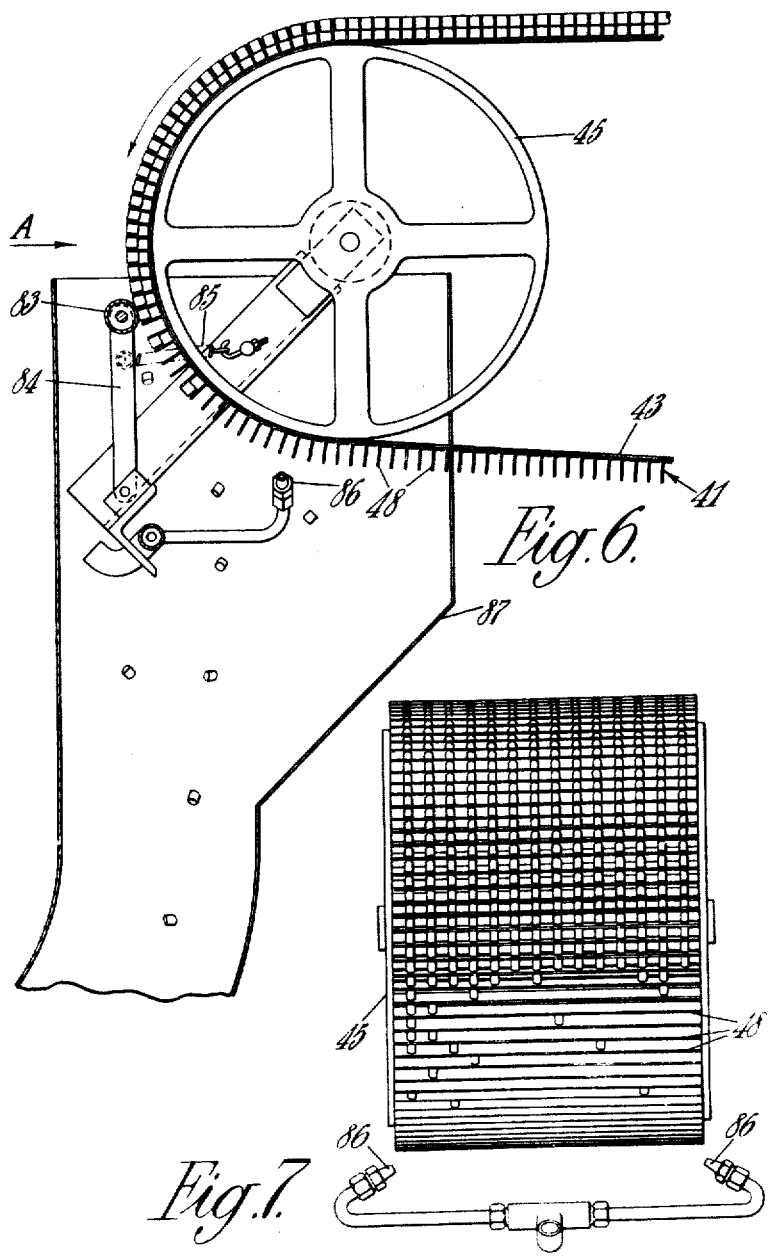

United States Patent Office 2,938,230
Patented May 31, 1960

2,938,230

MANUFACTURE OF PELLETS OR GRANULAR MATERIAL

Christopher Lawrence Sainty, Hassocks, England, assignor to Structural Concrete Components Limited, Hassocks, England Filed Sept. 24, 1956, Ser. No. 611,701

Claims priority, application Great Britain Sept. 27, 1955

13 Claims. (Cl. 18—4)

This invention relates to the manufacture of pellets or granular material and has for its object to provide an improved method and means for producing such pellets or material. Another object is to provide apparatus for producing pellets or granular material from materials of a mouldable or plastic character, such for example as moist clay.

The invention comprises feeding a continuously formed strip of material of a plastic or mouldable character to travelling dividing means or blades so as to divide or partially to divide the strip into uniform sections, drying the said sections and discharging them as separated pellets or granulated material.

The invention also consists in apparatus for the production of pellets or granulated material comprising means for feeding a continuously formed ribbon or strip of material having a plastic or mouldable character to conveying means provided with transversely disposed blading to divide or partially to divide the ribbon or strip into uniform lengths or sections, means for drying the divided or partially divided material on the conveying means, and means for discharging the dried lengths or sections in separated condition.

According to a further feature of the invention an extruded ribbon or strip of the plastic or mouldable material is fed to the conveying means in conjunction with a driven roller arranged to press the ribbon or strip upon the blading to effect the required division. Preferably means is provided for continuously lubricating the said roller and the blading to prevent adhesion of the material to the roller or blade surfaces.

Discharge of the dried material in pellet or granular form is preferably effected by the aid of the opening of the blading as the conveyer means passes over a roller or equivalent means at the discharge end thereof, assisted if necessary by an extractor or breaker roller and air blast arrangements.

The invention further comprises means for dealing with mouldable or plastic material and for treating partially dried pellets or particles of such material as described and claimed hereinafter.

Figure 2 is a similar view of a part of the right hand end of the apparatus of Figure 1 on an enlarged scale;

Figure 3 is an end view of the oil distributing arrangement shown in Figure 2;

Figure 4 is a cross section taken on the line X—X of Figure 1;

Figure 5 is a cross section taken on the line Y—Y of Figure 1;

Figure 6 is a side elevation of like discharge end of the conveyer of Figure 1 to an enlarged scale;

Figure 7 is an end view of Figure 6 taken in the direction of the arrow A, certain parts being omitted;

Figure 8 is an end view of the outlet plate of the rotary tumbler.

Figure 1:
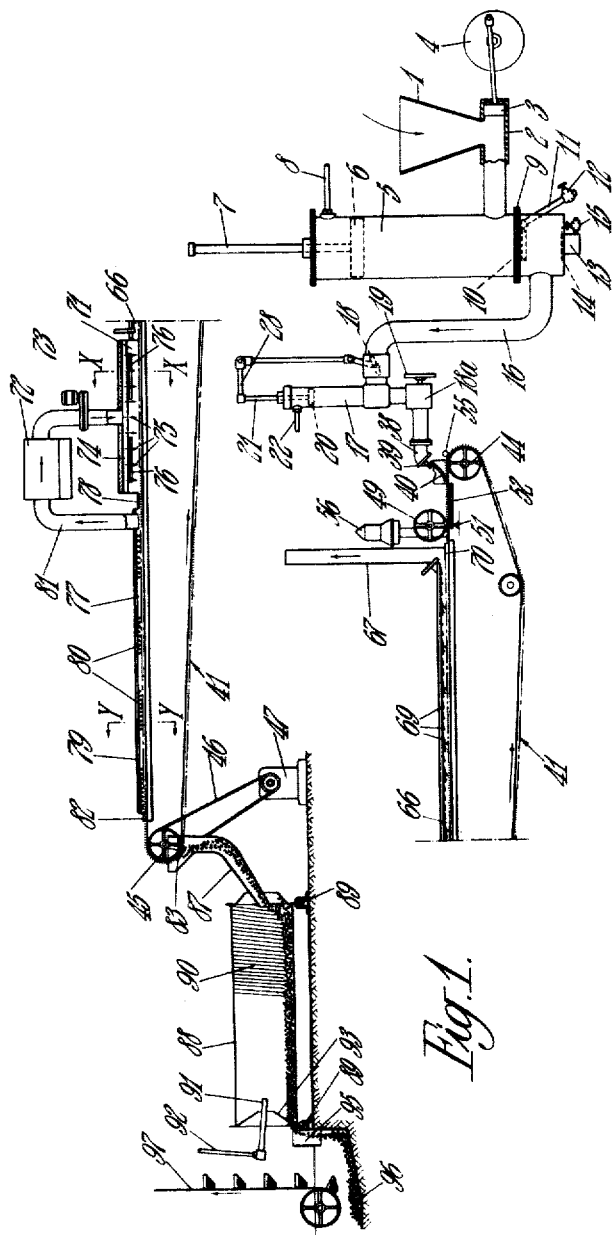
Figure 1 is a general side elevation, partly in section, of a plant or apparatus for producing pellets or granular material from moist clay or the like in accordance with the invention.

In carrying the invention into effect according to one convenient mode as applied by way of example to a plant or apparatus for the manufacture of clay pellets which can be used as an aggregate there is provided, as shown in the drawings, a hopper 1 to which suitably prepared clay is delivered and from which the clay passes to the cylinder 2 of a ram pump having a piston 3 reciprocated from a rotary crank disc 4. The clay is discharged by the piston 3 into an accumulator comprising a vertical cylinder 5 in which is slidable a piston 6 guided by a slidable rod 7. The space above the piston 6 is supplied by a pipe 8 with compressed air from a suitable source at constant pressure so that the pressure on the clay is maintained substantially constant although it is being supplied intermittently by the pump 2. Also the loaded accumulator piston 6 permits the rates of delivery to and discharge from the accumulator to vary periodically. An apertured partition plate 9 is provided near the lower end of the accumulator 5 and the aperture therein is provided with a screen 10, preferably consisting of two layers of parallel round rods secured with the rods of the respective layers lying at right angles to afford a square mesh. The size of the mesh is such as to prevent the passage of stones or other undesired articles which may not have been separated out in the preliminary preparation of the clay. Passage of the clay through the screen 10 produces a pressure drop and advantage of this is taken to remove air which may be trapped in the clay. The air collects under the partition plate and screen and is discharged through a pipe 11 having a bleed valve 12. A sump 13 covered by suitable mesh 14 is provided at the lower end of the accumulator to collect water released from the clay, this being discharged by a valve 15.

Clay from the accumulator 5 passes through a pipe 16 leading to a pressure regulating cylinder 17 through a regulating valve indicated diagrammatically at 18, the purpose of the regulating cylinder being to regulate the flow of clay to the inlet of an auger pump or screw pump 18a having a drive member 19. The regulating cylinder has a piston 20 on a slidable rod 21 and air pressure from a suitable constant pressure source is led to the space above the piston by a pipe 22. The piston rod 21 is connected by suitable linkage indicated diagrammatically in Figure 1 to the regulating valve 18. It may be explained that the auger pump is not capable of exerting suction when handling clay of the consistency required and hence must be fed with clay under a positive pressure. Also, although the bulk pressure of the clay in the accumulator 17 is substantially constant it has been found that various factors, such for example as small variations in clay properties and the action of the reciprocating pump 2, may cause periodic changes in the rate of discharge. Referring to Figure 2 which shows this part of the plant in greater detail, the body 23 of the regulating valve has a horizontal partition 24 which provides two parallel passages for the clay, the upper passage 25 containing the butterfly valve 18 and the lower passage 26 being a by-pass for the passage 25. The amount of clay entering the by-pass passage 26 can be varied by means of an adjustable gate 27. The piston rod 21 has an arm 28 which can move vertically in a slotted guide 29 secured to the upper end of the cylinder 17 and having a stop 30. The arm 28 is connected to a link 31 for actuating an arm 32 on the spindle 33 of the butterfly valve 18. When the flow of clay exceeds the rate at which it can be handled by the auger pump 18a the piston 20 will rise and effect a closing movement of the valve 18 through the linkage 31. The arrangement is such that a substantially constant pressure can be maintained at the inlet to the pump 18a with relatively little movement of the piston 20. The compressed air supply to the upper end of the regulating cylinder 17 is controlled by a reducing valve 34 and an adjustable leak-of 35, the latter permitting the piston to rise without appreciable increase in the air pressure. The pump 18a is provided with gauges 36 and 37 for measuring clay pressure.

The pump 18a discharges into a manifold 38 to the forward end of which are secured a series of tubular nozzles 39 of uniform shape for extruding the clay in the form of a series of ribbons or strips. The cross section of the nozzles may be of any devised shape e.g. circular, rectangular, or oval, but nozzles of circular cross section are shown in the present example. The extruded ribbons of clay are received by a guide structure comprising separate downwardly inclined guide plates 40 from which they are directed to the upper surface of a travelling conveyer indicated generally at 41. If the speed of the conveyer is equal to that of the extruded ribbons the latter will follow the guide plates. It is preferred, however, to run the conveyer at a slightly higher speed so that the ribbons hang in loops as indicated at 42 in Figure 2.

The conveyer 41 comprises a flexible web 43 supported upon a pair of rollers 44 and 45, the latter being driven by a belt 46 from a motor 47. The surface of the web 43 is provided with a continuous series of upstanding transversely disposed blades 48 uniformly spaced at a distance determined by the length of the pellets or granules desired. The blades are formed from thin material such as sheet metal and may comprise angled members riveted or otherwise secured to the web. The outer edges of the blades may be formed as knife edges if desired. Means is provided for feeding the extruded ribbons so that they are pressed upon the transverse blading 48 and thereby divided or partly divided into equal lengths. Such means comprises a transversely disposed roller 49 mounted for rotation in suitable bearings (not shown) and having its under surface located just above the upper edges of the blades 48 passing beneath it. The conveyer is pressed against the face of the roller 49 by means of a transverse pressure plate 50, the upper surface of which is slotted or grooved to afford clearance for the heads of the rivets securing the blades 48 to the conveyer web. The pressure plate 50 is upwardly loaded by springs 51 and is carried on one end of an arm 52 hinged at 53 to a support 54 (Figure 2) with such clearance that the plate can float transversely with the conveyer. The roller 49 is driven by suitable means (not shown) so that its surface moves in the same direction as the extruded ribbons and at the same linear speed as that of the ribbons and of the conveyer, the various drives being adjusted to obtain this result. Where, as in the present instance, the extruded material is of a sticky character such as moist clay, means is provided for lubricating the surfaces of the roller and blades. For this purpose a roller 55 (Figures 2 and 3) covered with oil retaining material is rotatably mounted so that it rests upon the blading 48 at the right hand end of the upper horizontal conveyer lap. Oil is supplied from a constant head tank 56 through a pipe 57 connected to a horizontal distributor pipe 58 having a series of fine holes along its upper side. Adjacent the pipe 58 is mounted a distributing plate 59 having a saw tooth formation 60 along its lower edge and arranged so that oil from the pipe 58 passes to the plate 59 and drips off the points 60 to the roller 55 which is thereby maintained saturated with oil. This arrangement ensures uniform oiling of the roller irrespective of whether the pipe 58 is exactly level. The roller rests under its own weight on each of the blades 48 in turn so that a small dose of oil is fed to each face of each of the blades in turn. A second pipe 61 leads from the tank 56 to a similar oil distributing device 62 for oiling the roller 49. Also a scraper blade 63 carried on pivoted arms 64 is provided for removing particles of clay which may adhere to the surface of the roller 49, such particles being collected in a trough 65.

The conveyer carrying the divided or partially divided extruded material as described above is caused to pass through a drying or heating zone. This comprises a preliminary drying chamber 66 having an outlet chimney 67 through which hot air from a drying chamber to be described later is caused to flow. The roof 68 of the chamber 66 is fitted with a series of baffles 69 which are adapted to direct the hot air downwardly towards the conveyer. An air lock constituted by a shallow tunnel 70 is provided where the conveyer enters the chamber 66. The conveyer then passes through a drying chamber 71 which is supplied with hot air from a furnace 72 by means of a blower 73. The hot air is distributed from a pressure box 74 through orifices which are indicated by the arrows 75 so that the air passes downwardly upon the conveyer. If desired, additional heating may be provided by radiant heaters 76 disposed above the conveyer.

It will be understood that the preliminary drying chamber 66 increases the thermal efficiency of the drying process by heat interchange between hot air from the drying chamber 71 and the relatively cool conveyer. Relatively little drying takes place in the chamber 66 since the relative humidity of the air therein is high. The purpose of the drying chamber 71 is to expose the partially divided or formed pellets of clay to a high rate of evaporation so that drying occurs mainly on their surfaces. This is facilitated by the rapid conduction of heat by the conveyer blades 48 which have a large surface area.

On leaving the drying chamber the conveyer enters a cooling chamber 77 through an air lock indicated at 78, similar to the air lock 70. The cooling chamber 77 is formed with annular spaces 70 which are open at the left hand end for the entry of air. Apertures 80 are provided in the walls of the lateral spaces 79 to enable air to enter the cooling chamber, and these apertures are arranged in spaced groups on opposite sides alternately. The suction of the blower 73 draws air from the cooling chamber through the duct 81 and the conveyer is thus subjected to horizontal blasts of cold air from each side alternately, affording a high state of turbulence and effecting a further rapid evaporation of moisture from the surfaces of the hot pellets. Further thermal economy is thus obtained by preheating of the air before it enters the furnace. The pellets on the conveyer leave the cooling chamber through an air lock indicated at 82 and as a result their outer surfaces or skins are comparatively dry and their centres soft. As the conveyer runs over the final driving roller 45 the blades 48 change from a parallel to a diverging relation which causes the lengths or sections of ribbon between them to break away from the blade surfaces as seen in Figure 6. Usually the pellets will be attached to one of the blades by a thin layer of clay which bridges the edge of the blade. To ensure the breaking of this attachment an extractor or breaker roller 83 is mounted on pivoted arms 84 and is loaded by a spring 85 so that it is held against the conveyer. The diameter of the roller 83 is such that it slightly penetrates the spaces between the blades. After passing the roller 83 the separated pellets slide off the blades by gravity. To ensure complete extraction of pellets at high speeds of operation there are provided a pair of air blast nozzles 86 fed from a suitable source. The extracted pellets fall into a chute 87 and are thence delivered into a tumbler cylinder 88 mounted on bearings 89 and rotated by any convenient means (not shown). For about half of its length at the pellet entry end the interior of the tumbler cylinder 88 is provided with a continuous helical thread 90 (or a groove or ridge formation) formed from half round bar welded or otherwise secured in position. This arrangement ensures that the pellets are continuously fed forwardly when they enter and this makes it possible to employ a relatively short and substantially horizontal tumbler. A gas (or other) burner 91 is centrally fitted at the outlet end of the tumbler and is supplied by a pipe 92, so as to produce an increasing temperature between outlet and inlet. The arrangement is such that the entering pellets which have a cylindrical form having a length approximately equal to their diameter are reduced to a substantially spherical form. To ensure this result the pellets entering the tumbler must have a suitable physical condition, i.e. they must be sufficiently surface dried but not over dried. This can be ensured by suitable adjustment of the initial moisture content of the clay employed, the temperature and quantity of drying air, and the conveyer speed. The outlet end of the tumbler cylinder is provided with a plate 93 (see Figures 1 and 8) having radial parts 94 through which the pellets are discharged into a chute 95 and thence to a hopper 96 from which they are removed by a bucket conveyer 97.

In practice it may be found that it is not possible to achieve uniformity of discharge from the clay extruding nozzles 39. One way of overcoming this difficulty is to run the conveyer at a speed of some 6 to 7 percent higher than the lowest speed of extrusion from the nozzles, so that the ribbons between the nozzles and the roller 49 hang in loops and stretch under their own weight as indicated at 42 in Figure 2. If one of the ribbons should break as a result of stretch it will be picked up again and there will be a gap of usually rather less than one inch in the continuity of the pellets from the nozzle. With this method of matching the extrusion and conveyer speeds it is necessary to allow sufficient space between the nozzles and the roller 49 to afford a loop of the desired length, and this spacing will depend upon the conveyer speed. It is found that with some types of clay and shale the above method is not satisfactory and this difficulty can be overcome by periodically cutting the ribbon. A mechanism for this purpose is shown in Figure 2. A suitable number of levers 98 are secured to a common shaft 99 and the lower arms of each pair of levers carry a horizontal cutting wire 100 which can be moved back and forth through the ribbon extruded from the nozzle. The shaft can be operated periodically through a spring loaded toggle mechanism which is diagrammatically indicated in Figure 2.

The tension in the conveyer can be maintained by a suitably loaded idler wheel or roller. Both the conveyer and the auger or screw pump are preferably driven through suitable speed varying means.

The invention is not restricted to the example described since the parts of the apparatus can be arranged in various ways, for example the conveying means need not be horizontally disposed.

One example will be given of the operating conditions using the apparatus described above. For a typical clay the initial water content of between 47 to 50% of its dry weight is reduced to 43 to 46% on leaving the conveyer and from 25 to 35 on leaving the tumbler cylinder. The clay pressure in the upper part of the accumulator vessel is from 130 to 150 lbs. the square inch, and at the outlet to the screw pump its pressure will be from 120 to 150 lbs. the square inch when extruding at 20 feet per minute. The temperature in the drying chamber will reach 450° F. and fall to 350° F., being finally vented at from 120 to 130° F.

By this invention there is provided a method and means for the purpose described which is simple and relatively inexpensive to carry into effect. It will be appreciated that the advantage of the invention can be achieved with many materials without the necessity of complete drying thereof since the formation of a sufficiently rigid outer skin on the material allows the sections to be separated. Also the rate of formation or extrusion of the ribbon or strip can readily be varied over a wide range to suit the drying time of the material, and the size and shape of the pellets can also be varied by changing the nozzle or die and the conveyor band. It will also be appreciated that as a result of the large surface of contact between the divided sections and the blading the possible rate of drying is high and hence a relatively short and compact apparatus can be employed. Further advantages afforded by the invention are that any possibility of cohesion or coagulation of the pellets or granulars can readily be obviated, and wear and tear of the apparatus is relatively small even when abrasive materials are used. The invention can be applied to a large range of materials which become non-adhesive when dried.

It is particularly suited to the pelletizing of sticky plastic material which cannot be processed in available types of apparatus.

In applications where spherical pellets are not required the length of the conveyer can be increased so that with added drying time and additional heating the pellets are completely or almost completely dried before leaving the conveyer. The tumbler would be dispensed with.

I claim:

1. Apparatus for the production of pellets or granulated material from plastic and mouldable material having a sticky character, comprising means for extruding a narrow ribbon or strip of said plastic and mouldable material, conveying means arranged to receive said strip or ribbon in its free fall from the extruding means, said conveying means haivng transversely disposed thin upright blades in spaced relation thereon upon which the strip or ribbon is received, means for pressing said strip or ribbon into said blades to at least partially divide the strip or ribbon into uniform lengths, heating and drying means arranged to effect at least partial drying of the strip or ribbon lengths upon the conveying means, and means for discharging the at least partially dried lengths in separated condition from the conveying means, said discharging means including a roller over which the conveying means passes at the discharge end thereof whereby discharge of the partially separated lengths of material is effected at least in part by the opening of the blades as they pass over said roller, and an extractive roller arranged to be resiliently pressed against the outer edges of the blades in the discharge region, whereby the opening of the blades and the pressure of the extractive roller coact to effect separation of the lengths of material from the blades, the diameter of the extractive roller being such that it can penetrate to a limited extent only between the blades.

2. Apparatus according to claim 1, including air blast means in the neighbourhood of the discharge region arranged to assist in the separation of the divided lengths of material from the blades.

3. Apparatus according to claim 1, in which the means for pressing the material into the blades comprises a driven roller.

4. Apparatus according to claim 1, in which the means for pressing the material into the blades comprises a driven roller, and further comprising means for continuously lubricating said roller and the blades.

5. Apparatus according to claim 1, in which the heating and drying means is arranged and operated to dry the outer skin only of the partially divided lengths of material, leaving a relatively soft centre.

6. Apparatus according to claim 1, in which the blades are composed of metal to afford ready transfer of heat to the partially divided lengths of material.

7. Apparatus according to claim 1, comprising a heated rotary tumbler cylinder to which the separated lengths of material from the conveying means are delivered, and in which said lengths are caused to assume a spherical form by tumbling action.

8. Apparatus according to claim 1, comprising a heated rotary tumbler cylinder to which the separated lengths of material from the conveying means are delivered, the entry end of said tumbler cylinder being provided with a helical groove formation.

9. Apparatus according to claim 1, in which the means for extruding the material comprises at least one extrusion nozzle, and comprising an auger pump for feeding material to said nozzle.

10. Apparatus according to claim 1, in which the means for extruding material comprises at least one downwardly directed extrusion nozzle, and an inclined guide plate arranged between said nozzle and the conveying means.

11. Apparatus according to claim 1, in which the means for extruding material comprises at least one downwardly directed extrusion nozzle so arranged in relation to the conveying means that the extruded strip or ribbon hangs in a loop.

12. Apparatus according to claim 1, in which the means for extruding material comprises at least one downwardly directed extrusion nozzle so arranged in relation to the conveying means that the extruded strip or ribbon hangs in a loop, and means is provided for periodically cutting the extruded strip.

13. Apparatus according to claim 1, in which the heating and drying means comprises a preliminary drying chamber, a heated drying chamber, and a cooling chamber.

References Cited in the file of this patent

UNITED STATES PATENTS

| | | |
|---|---|---|
| 356,450 | Coleman | Jan. 25, 1887 |
| 1,041,565 | Arthur | Oct. 15, 1912 |
| 1,594,390 | Van Stone et al. | Aug. 3, 1926 |
| 1,751,430 | Thomson | Mar. 18, 1930 |
| 2,172,638 | Hermann | Sept. 12, 1939 |
| 2,348,847 | Pike | May 16, 1944 |
| 2,464,746 | Gering | Mar. 15, 1949 |
| 2,531,574 | Lang | Nov. 28, 1950 |
| 2,541,109 | Shabaker | Feb. 13, 1951 |
| 2,565,374 | Kitchel | Aug. 21, 1951 |
| 2,571,932 | Olsson | Oct. 16, 1951 |
| 2,711,557 | Russell | June 28, 1955 |
| 2,749,590 | Kilpatrick | June 12, 1956 |
| 2,752,656 | Rutgers | July 3, 1956 |

FOREIGN PATENTS

| | | |
|---|---|---|
| 655,185 | Great Britain | July 11, 1951 |